United States Patent [19]

Briggs et al.

[11] Patent Number: 4,960,317
[45] Date of Patent: Oct. 2, 1990

[54] WALL OUTLET FOR A FIBER OPTIC CONNECTOR ASSEMBLY

[75] Inventors: Robert C. Briggs, Newport; Robert N. Weber, Hummelstown; John C. Hoffer, Harrisburg, all of Pa.

[73] Assignee: AMP Incorporated, Harrisburg, Pa.

[21] Appl. No.: 395,680

[22] Filed: Aug. 18, 1989

Related U.S. Application Data

[62] Division of Ser. No. 236,103, Aug. 23, 1988, abandoned.

[51] Int. Cl.⁵ .............................................. G02B 6/38
[52] U.S. Cl. ............................... 350/96.21; 350/96.20
[58] Field of Search ................ 350/96.20, 96.21, 96.22

[56] References Cited

U.S. PATENT DOCUMENTS

| | | | |
|---|---|---|---|
| 4,611,887 | 9/1986 | Glover et al. | 350/96.21 |
| 4,850,901 | 7/1989 | Smith et al. | 439/676 |
| 4,874,904 | 10/1989 | DeSanti | 174/53 |

*Primary Examiner*—William L. Sikes
*Assistant Examiner*—Akm E. Ullah
*Attorney, Agent, or Firm*—Gerald K. Kita

[57] ABSTRACT

A fiber optic wall outlet (8) has an annular flange (220) for mounting a wall, and a hood (218) mounted in the flange (220). The hood (218) is movable between a closed position wherein the hood 218) is flush with the wall, and an open position wherein the hood (218) projects away from the wall. The wall outlet (8) further includes a spring member (248) which urges the hood (218) to snap outward, and fingers (228) which engage against the annular flange (220) and prevent hood (218) from snapping outward. When a positive upward force is applied to hood (218), the fingers (228) are freed from the flange (220) and the hood (218) snaps outward. An interconnect assembly (6) to which a first optical fiber cable (172) is connected is mounted in wall outlet (8). When hood (218) snaps outward, access is provided to interconnect assembly (6) so that a plug (4) connected to a second optical fiber cable (70) can be plugged into interconnect assembly (6) thereby optically coupling the optical fibers in the two cables (70, 172).

20 Claims, 10 Drawing Sheets

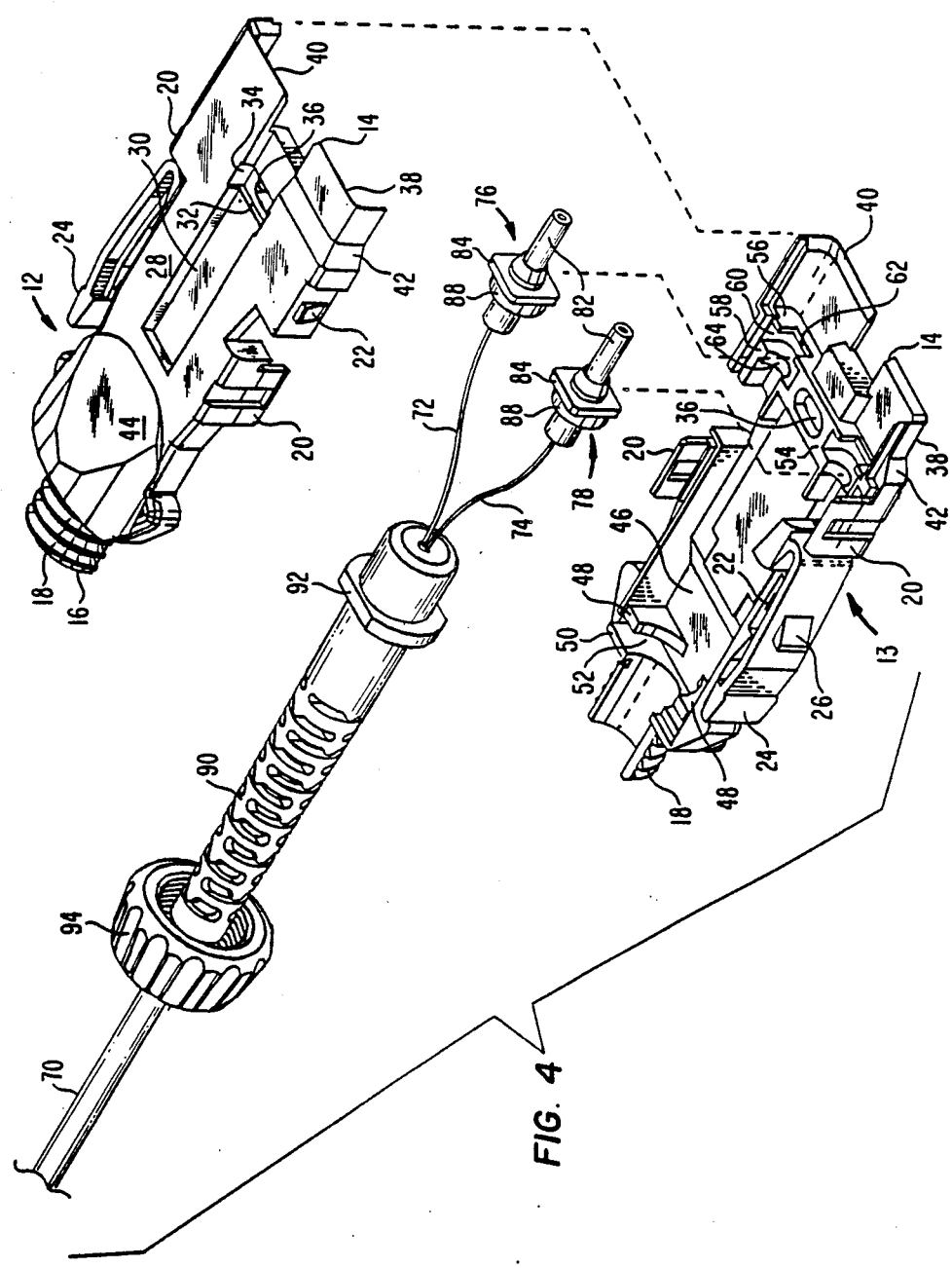

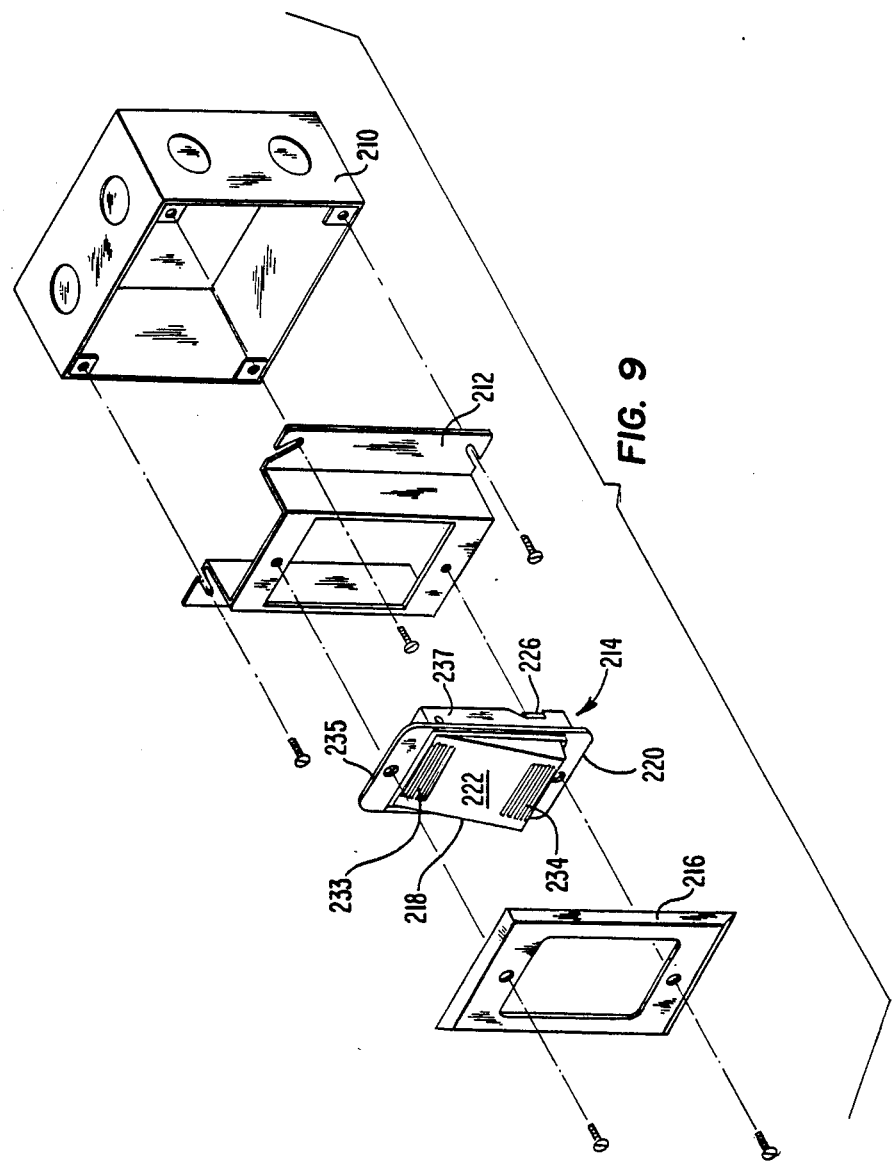

WALL OUTLET FOR A FIBER OPTIC CONNECTOR ASSEMBLY

This is a division of Ser. No. 236,103 filed Aug. 23, 1988, now abandoned.

BACKGROUND OF THE INVENTION

The invention relates to a wall outlet for a fiber optic connector assembly. More particularly, the invention relates to a wall outlet containing a fiber optic interconnect assembly into which a fiber optic cable can be plugged when a spring loaded hood of the wall outlet is snapped out.

In recent years, electro optical equipment has begun to replace electronic equipment for certain applications, for example, for telecommunications networks. This trend is expected to continue because of the inherent advantages that electro optical equipment has over electronic equipment for these kinds of applications. In order to interconnect various pieces of electro optical equipment, fiber optic cables are used. The fiber optic cables comprise optical fibers surrounded by shielding with connectors at the ends thereof. The appearance of the fiber optic cables resembles electric shielded cables, such as coaxial cables.

A great deal of effort has been applied to developing connectors for optical cables which generally correspond to electrical connectors. U.S. Pat. No. 4,687,291 (Stape et al.), which is incorporated herein by reference, describes a fiber optic assembly for mating the optical fibers of a duplex fiber optic cable with like fibers of a second duplex cable or with a pair of simplex cables while achieving maximum axial alignment of the respective fiber pairs. This patent discloses novel simplex and duplex cable connectors and an interconnect member which receives either the simplex or duplex connectors at its opposite ends.

U.S. Pat. No. 4,611,887 (Glover et al.), also assigned to the present assignee and incorporated herein by reference, discloses and claims a fiber optic connector assembly and a wall outlet into which it connects. As explained therein, cable terminating connectors are employed that are polarized to prevent mismating. The interconnect system is designed to be easily assembled while accurately aligning the terminated ends of fiber optic transmission members for optimum operation. The wall outlet is designed to contain one half of the interconnect system. Since it is desirable that the wall outlet protect the interconnect assembly as much as possible, the wall outlet includes a shutter member which covers that half of the interconnect assembly when it is not being utilized.

The wall outlet of U.S. Pat. No. 4,611,887 further includes a hood beneath which the shutter member is pivotally mounted. The shutter member is spring biased against the hood when the wall outlet is not in use. When it is desired to use the wall outlet, a plug connector is brought to bear against a projection of the shutter member causing it to pivot away from the hood. The plug connector is then guided into a latch connection within the portion of the interconnect system contained within the wall outlet.

The hood of the wall outlet described in U.S. Pat. No. 4,611,887 is a rigid structure. It projects outwardly from the wall and remains in that position even when the wall outlet is not being used. The shutter member pivots within the hood while the hood projects outwardly from the wall at all times. It would be more desirable, however, for aesthetic and for practical reasons to provide a wall outlet into which an optical fiber cable is plugged which wall outlet lays flat against the wall when it is not in use.

Accordingly, it is an object of the invention to provide a wall outlet for interconnection with a plug terminated optical fiber cable which wall outlet includes a spring loaded hood, the hood laying flush with the wall when the wall outlet is not in use and snapping outward when it is desired to utilize the wall outlet.

It is another object of the invention to provide a wall outlet for interconnection with a plug terminated optical fiber cable which wall outlet receives within it an interconnect assembly.

It is a further object of the invention to provide a wall outlet for interconnection with a plug terminated optical fiber cable which provides a shuttering system to protect an interconnect assembly mounted in said wall outlet when the wall outlet is not being utilized.

SUMMARY OF THE INVENTION

The inventive fiber optic wall outlet comprises an annular flange, a hood mounted in the annular flange, the hood being movable between a closed position wherein the hood is flush with the wall and an open position wherein the hood projects away from the wall, and a spring connected to the hood which urges the hood into its open position. The wall outlet further comprises projecting fingers which engage against the flange and secure the hood in its closed position, and a release mechanism which disengages the fingers from the flange and permits the hood to snap outward.

An aspect of the invention is that the release mechanism comprises a shaft mounted in an oval shaped aperture of the flange. The shaft is movable within the oval shaped aperture so that in a first position the fingers of the hood are engaged against the flange, and in a second position the fingers are disengaged from the flange.

A further aspect of the invention is that an interconnect assembly is provided which is latchingly secured to an inner surface of the hood when the hood is closed, the interconnect assembly thereby being enclosed within the wall and protected by the hood. When the hood is opened, access is provided to the interconnect assembly and a plug connector may be plugged into it.

Yet another aspect of the invention is that the hood, the interconnect assembly and the plug connector are provided with latching lugs and apertures so that they can all be secured together in snap lock fashion.

BRIEF DESCRIPTION OF THE DRAWINGS

The present invention will be described by way of example with reference to the accompanying drawings in which:

FIG. 4 is an exploded view of a plug connector forming a part of the connector assembly;

FIG. 9 is an exploded view of the various parts forming the wall outlet of the present invention;

DETAILED DESCRIPTION OF ILLUSTRATED EMBODIMENT

Figure 3:
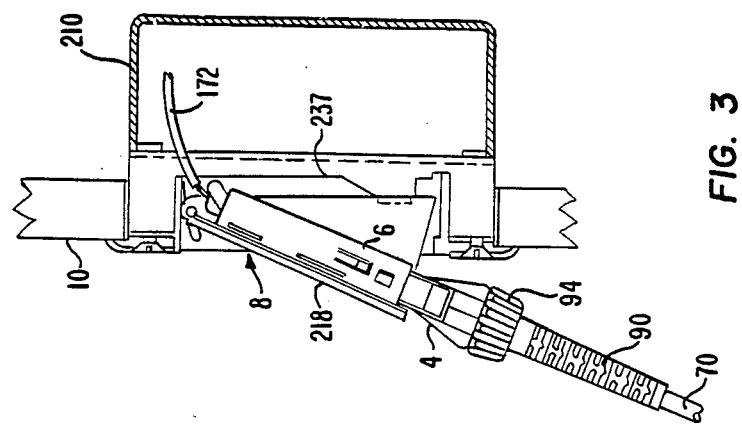
FIGS. 1-3 show three stages of the interconnection of a fiber optic connector assembly with a wall outlet of the present invention.
Figure 2:
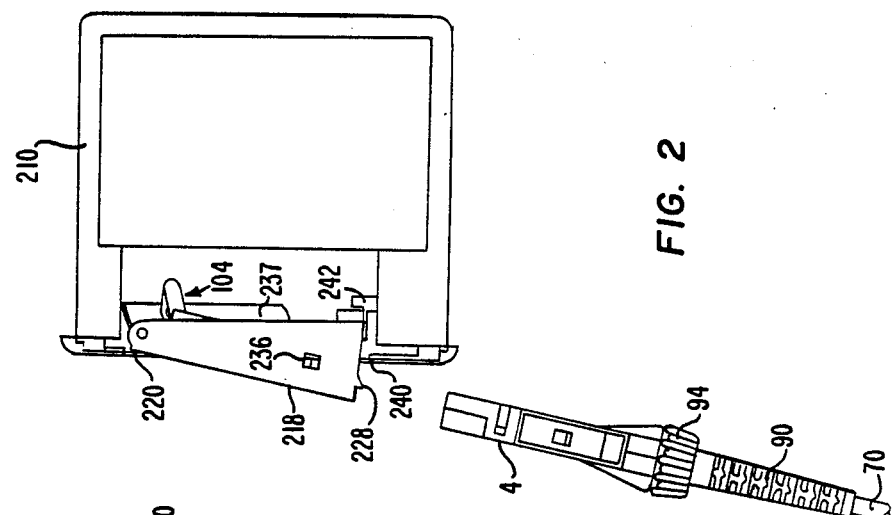
Figure 1:
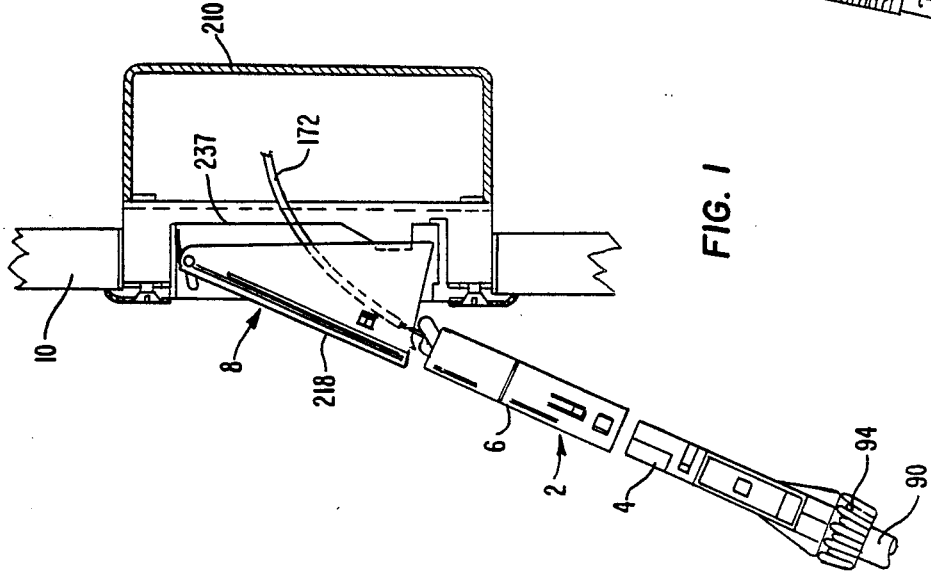

FIGS. 1–3 illustrate the manner in which a fiber optic connector assembly 2 comprising a duplex plug connector 4 and duplex interconnect assembly 6 are plugged into a wall outlet 8 mounted in a wall 10. As can be seen, interconnect assembly 6 having a first optical fiber cable attached thereto is first inserted into wall outlet 8 and thereafter plug 4 which terminates a second optical fiber is plugged into interconnect assembly 6. This results in axial alignment of the optical fibers within the cables.

Figure 5:
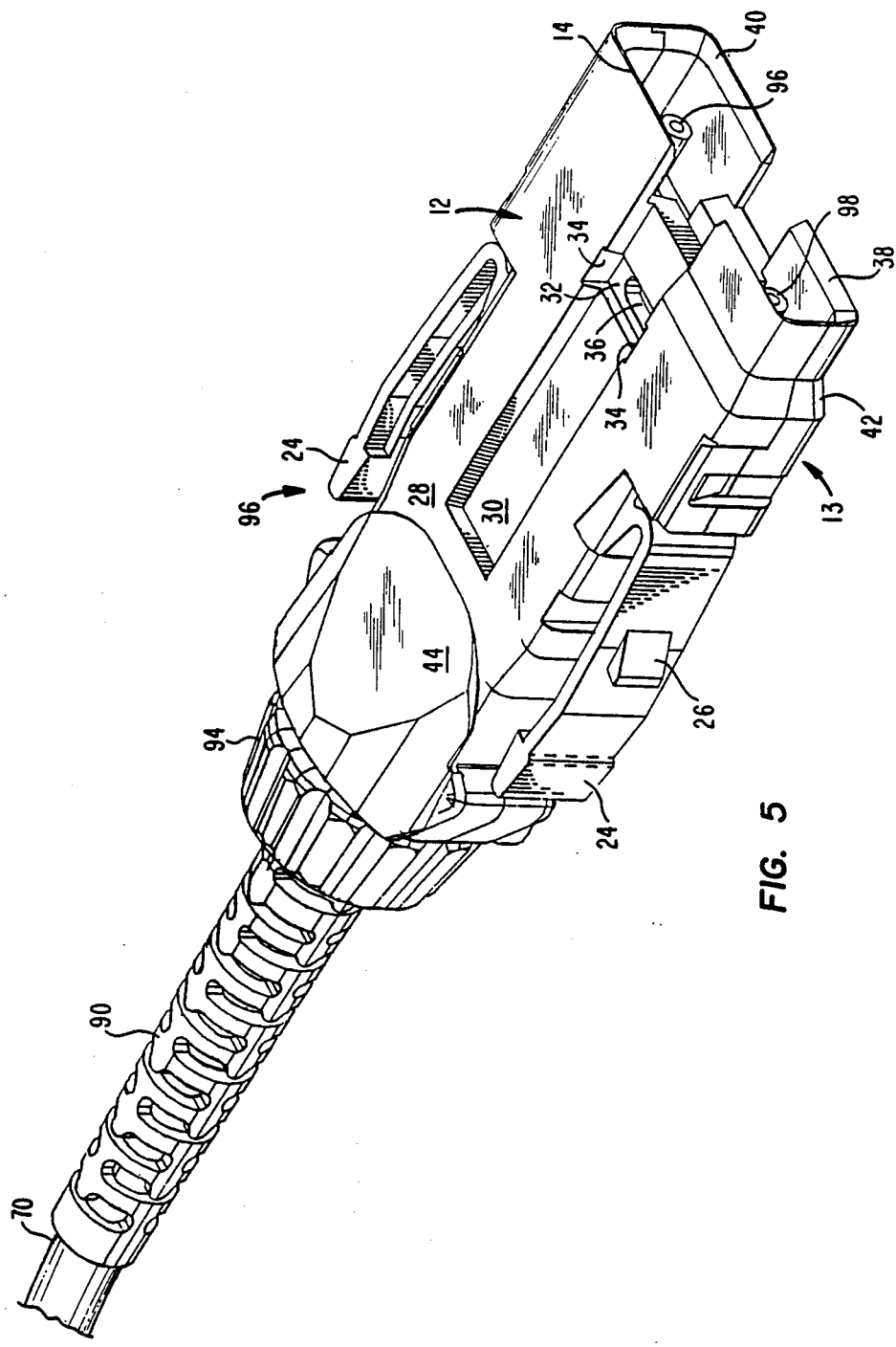
FIG. 5 is a perspective view of the assembled plug shown in FIG. 4.

Considering first the duplex plug connector 4 and referring to FIGS. 4 and 5, duplex plug 4 comprises a first or "top" body portion 12 and a second or "bottom" body portion 13 of the plug. Typically, top and bottom portions 12 and 13 are molded from, for example, thermoplastic material. Top portion 12 includes a front end 14 for insertion into interconnect assembly 6, and a rear portion 16 including an externally threaded cable entry 18. Top portion 12 includes a pair of plug assembly latches 20 on opposite sides which are spatially staggered from each other, and a pair of complementary lugs 22. Top 12 further includes a single latching arm 24 which includes thereon a latching lug 26 as best seen in connection with bottom portion 13.

A top exterior surface 28 of top 12 has an axially extending channel 30 recessed therein. Channel 30 extends axially from the forward end 14 rearwardly along the plug 4. Within channel 30, near the front of the plug 4, is a detent 32. Detent 32 extends across channel 30 and laterally beyond on each side thereof into top exterior surface 28, thus forming a pair of lateral notches 34. An aperture 36 for receiving a keying element (not shown) is formed in the bottom of detent 32, as seen in FIG. 4, and extends through to the interior of top portion 12.

Offset on one side of front end 14 there is formed one half of a male shroud element 38. One half of a female shroud element 40 is formed offset at the opposite side of front end 14. As shown in FIGS. 4 and 5, top portion 12 includes a sloped or beveled portion 42 which tapers inwardly and from which shroud element 38 extends. A space or gap is formed between shroud elements 38 and 40 at the forward end 14 of the plug 4 in front of channel 30.

A flattened gripping surface 44 is provided on top and bottom portions 12 and 13 of plug 4. Gripping surface 44 is flared outwardly toward the rear 16 of the plug 4.

Bottom portion 13 is complementary to and designed to mate with top portion 12. The configuration of bottom portion 13 is in almost all respects the same as that of top portion 12, with corresponding parts being designated by corresponding reference numerals. The interior configuration of bottom portion 13 will now be described, it being understood that the same corresponding configuration is present in top portion 12.

An interior cavity 46 is formed forward of cable entry 18. Just forward of cable entry 18 are interior flanges 48 forming, with the rear wall 50, a pair of slots 52 on opposite sides of the cable entry 18.

At the forward end 14, surrounding key element receiving passage or aperture portion 36, there is an integrally molded web or bulkhead 54 which extends the full depth of top portion 12. Bulkhead 54 forms a rigid mass about aperture portion 36. Extending laterally from bulkhead 54 are forward ribs or ridges 56 and rearward ribs or ridges 58. Together with bulkhead 54, ridges 56 and 58 strengthen and make rigid the front end 14 of top plug portion 12, and particularly the part thereof surrounding aperture portion 36.

Between ridges 56 and 58 are a pair of cavities 60. Recesses or grooves 62 and 64 are formed in ridges 56 and 58, respectively, communicating with cavities 60 between the corresponding ridges. Recesses 64 are semicircular and recesses 62 are rectangular in shape.

A major difference exists between top portion 12 and bottom portion 13 in that bottom portion 13 includes an exterior bottom surface which is substantially flat and does not have a channel corresponding to channel 30 of top portion therein. Channel 30 provides a polarizing asymmetry in plug 4 and ensures that it mates with interconnect assembly 6 in the proper sense.

As shown in FIG. 4, plug 4 is joined with an optical fiber cable 70 having therewithin a pair of optical fibers 72 and 74. Optical fibers 72 and 74 are terminated by ferrules 76 and 78, respectively. Ferrules 76 and 78 may be formed of thermoplastics, ceramics, metals or other suitable materials.

In the embodiment shown in FIG. 4, each of ferrules 76 and 78 has a nose 82. An annular flange 84 is formed to surround a corresponding ferrule and an 0 ring 88 is positioned against the flange 84. Cable 70 is provided with a strain relief 90 having an integral annular flange 92. An internally threaded nut 94 is also provided for engagement with externally threaded portions 18.

When assembling the components illustrated in FIG. 4, ferrules 76 and 78 are seated in respective grooves 62 and 64 associated with ridges 56 and 58 so that flange 84 and 0 rings 88 are seated in respective cavities 60 of bottom portion 66. Strain relief 90 is assembled with bottom portion 66 with flange 92 being positioned within slots 52. Optical fibers 72, 74 extend through cavity 46 between cable 70 and ferrules 76, 78.

Top plug portion 12 is brought into engagement with bottom portion 13 as follows. When top 12 and bottom 13 are assembled to engage each other, ferrules 76 and 78 are seated within slots 60 and grooves 62, 64 of top portion 12 in the same manner described with respect to bottom portion 13. Flange 92 of strain relief 90, likewise, is positioned within slots 52 of top portion 12 in the same manner as with respect to bottom portion 13.

Latches 20 of top portion 12 engage and latch against lugs 22 of bottom portion 13. Likewise, the latches 20 of bottom portion 13 engage and latch against lugs 22 of the top portion, thus securing the top and bottom portions together. Nut 94 is then threaded onto threaded cable entry portions 18 completing assembly of the plug 4.

Bulkheads 54, 54, forward ridges 56, 56, and rearward ridges 58, 58 of the top and bottom portions 12 and 13, respectively, engage each other when the top and bottom portions 12 and 13 are brought together. This forms a substantially surrounding mass of material through the entire depth and width of the plug 4 and completely about aperture portions 36, 36. This stiffens front end 14 of the plug 4, resisting deformation and making a rectangular exterior portion of the plug surrounding the apertures. Aperture portions 36, 36 form a continuous keying element receiving passage through the plug.

FIG. 5 is a perspective view of the assembled plug 4 comprising top portion 12 and bottom portion 13 connected to each other and to cable 70. As shown in FIG. 5, the latching arms 24 associated with the top and bottom portions 12 and 13, respectively, form a symmetric pair of latching arms disposed on opposite sides of the assembled plug 4. Extending from front end 14 is a complete male shroud portion 38 formed by the top and bottom male shroud elements 38, 38 discussed above. Likewise, extending from front end 14 is a female shroud portion formed by the top and bottom shroud elements 40, 40. Between each corresponding pair of the male and female shroud portions are corresponding spaces or gaps. A pair of terminated ends 96 and 98 of optical fibers 72 and 74 extend from end 14 of the plug 4 within the area protected by the shroud comprising portions 38 and 40. Ends 96 and 98 correspond to the nose portions 82 of ferrules 76, 78. When viewed from front end 14, plug 4 is substantially rectangular in shape.

FIGS. 6-9 illustrate a duplex interconnect assembly 6 which facilitates coupling to each other of the duplex plug 4 with an optical fiber cable mounted in the wall. Interconnect assembly 6 is also molded from a thermoplastic material.

Figure 6:
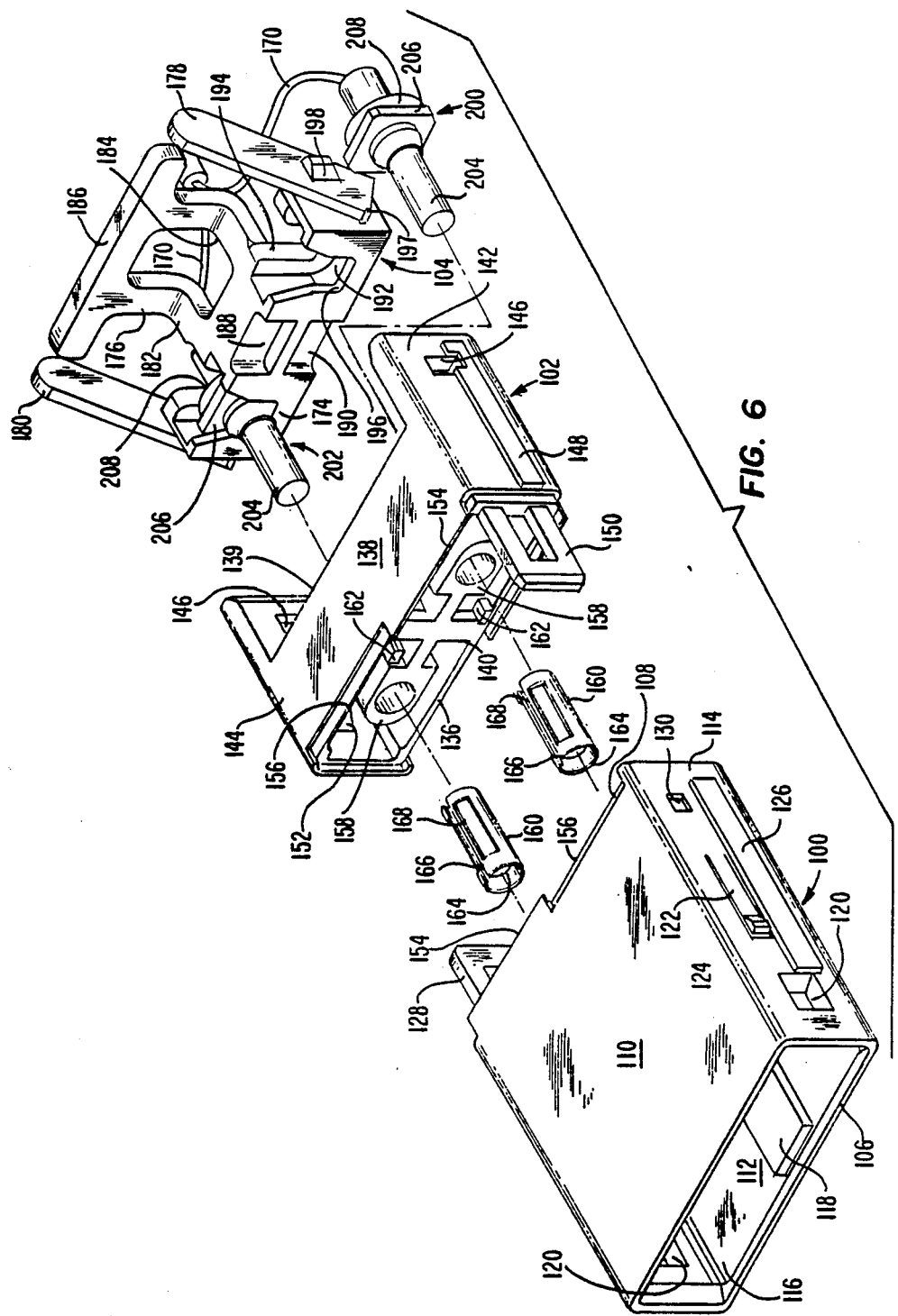
FIG. 6 is an exploded view of a duplex interconnect assembly also forming a part of the connector assembly.
Figure 13:
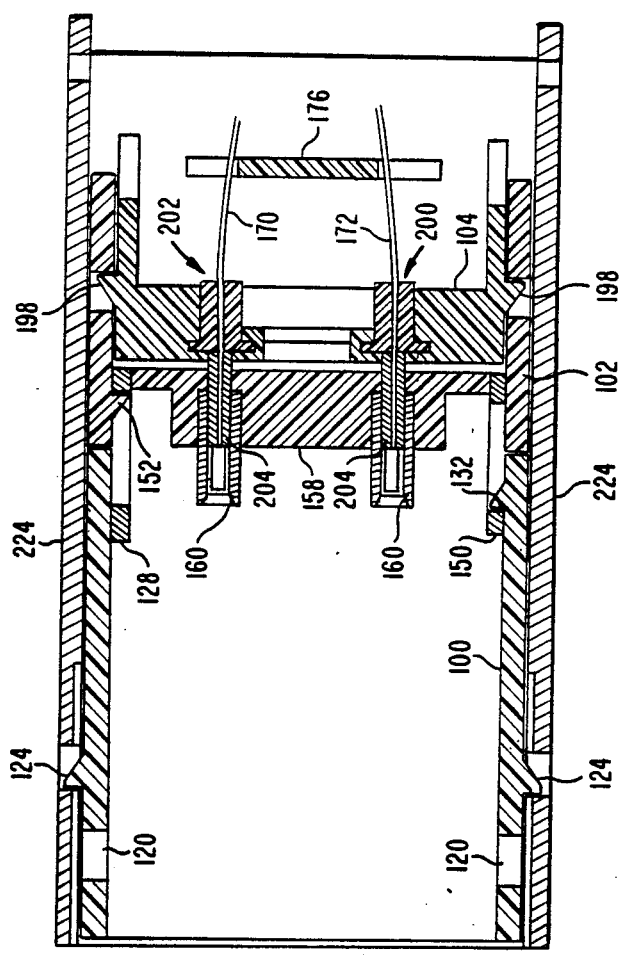
FIG. 13 is a top sectional view of the duplex interconnect assembly mounted in the hood of the wall outlet.

FIG. 6 is an exploded view of the interconnect assembly 6 which is of a generally tubular rectangular configuration and comprises an interconnect receptacle 100, an interconnect adapter 102, and a ferrule holding clip 104. Receptacle 100 is a substantially hollow rectangular box and includes first and second open ends 106, 108, top and bottom surfaces 110, 112, and sidewalls 114, 116. A rib 118 runs along the inside of bottom surface 112. Rib 118 is designed to be received within channel 30 of plug 4, thus ensuring that plug 4 can be inserted into receptacle 100 one way only. Each of sidewalls 114, 116 includes a lug receiving slot 120, a latching arm 122 having a lug 124, and a raised rib 126. Extending forwardly from one sidewall only, in this case sidewall 116, is a latch 128. The opposite sidewall 114 has an aperture 130 and a lug 132 (see FIG. 13) on its inside surface immediately adjacent aperture 130. Bushing support openings similar to those shown in connection with adapter 102 are located inside end 108 of receptacle 100.

Interconnect adapter 102 of interconnect assembly 6 is similar in structure to receptacle 100. Adapter 10 is substantially hollow and includes first and second ends 134, 136, top and bottom surfaces 138, 140 and sidewalls 142, 144. The top surface 138 includes a cutaway open portion 139 Each of sidewalls 142, 144 includes a lug receiving slot 146 and a raised rib 148 similar, though shorter in length than the raised ribs 126 of receptacle 100. Extending from sidewall 142 only is a latch 150.

The other sidewall 144 has an aperture (not shown) similar to aperture 130 and a lug 152 on its inside surface.

The ends 108 and 136 of receptacle 100 and adapter 102 are of like configuration and are adapted to be joined together. Ends 108 and 136 each include staggered and oppositely disposed flanges 154 and surface recesses 156. Symmetrically disposed within adapter 102 is a pair of support Openings 158 adapted to receive and support a pair of alignment bushings 160. Receptacle 100 includes a like pair of support openings (not shown). A pair of diagonally disposed projections 162 extend a short distance from end 136 of adapter 102. A similar but oppositely disposed pair of projections (not shown) extend from end 108 of receptacle 100.

When receptacle 100 and adapter 102 are brought together, latches 128 and 150 engage with the respective latching lugs 152 and 132 on the inside surfaces of the sidewalls. This latch and lug arrangement secures the receptacle 100 and adapter 102 in engagement with each other. Flanges 154 are received within corresponding surface recesses 156. Oppositely disposed projections 162 are received within opposite open interiors of receptacles 100 and adapter 102. The overlap of flanges 154 with surface recesses 156 covers the seam at the interface of the receptacle 100 and adapter 102. In addition, the support openings 158 of receptacle 100 and adapter 102 are brought into axial alignment with each other.

Alignment bushings 160 are generally cylindrical in configuration and include an axially extending aperture 164. Each end of aperture 164 has a flared opening 166. Bushings 160 are preferably molded or otherwise formed of a thermoplastic material, having a given cylindrical wall of thickness. Such thickness is sufficient to make bushing 160 substantially rigid. However, an axially extending slit 168 is formed through the wall of bushings 160. Slit 168 permits bushings 160 to expand slightly, despite the generally rigid structure of the bushing.

As illustrated, a pair of bushings 160 are associated with receptacle 100 and adapter 102, each bushing being supported within a cylindrical support opening 158. The diameter of bushing 160 is slightly smaller than the diameter of opening 158. This permits bushings 160 to expand to a limited degree when flexing outwardly in the manner described above.

Figure 7:
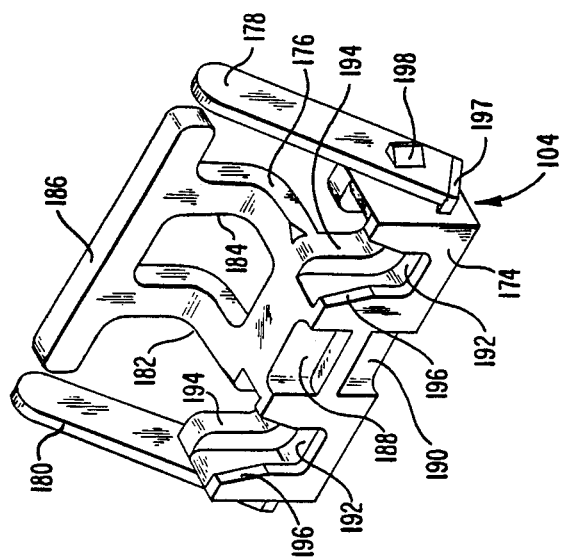
FIG. 7 is a perspective view of a ferrule holding clip forming a part of the duplex interconnect assembly.

Interconnect assembly 6 further comprises ferrule holding clip 104 which is designed to interconnect with adapter 102 at one end while bringing optical fibers 170 of optical fiber cable 172 into alignment with optical fibers 72, 74 of cable 70. As best seen in FIG. 7, ferrule holding clip 104 comprises a substantially solid base portion 174, a rear support portion 176, and two arms 178, 180 extending diagonally upward from the outside of base portion 174 in the general direction of rear support portion 176. Rear support portion 176 comprises a pair of L shaped legs 182, 184 and an elongated member 186 extending across and on the top of legs 182, 184. Base portion 174 includes upper and lower cutaway portions 188, 190. A pair of ferrule receiving channels 192 are formed between ridges 194, 196 in base portion 174. Ridges 194 define semicircular recesses while ridges 196 define rectangular recesses. Each of arms 178, 180 is joined to base portion 174 by a short attachment member 197. Because arms 178, 180 are joined to base portion 174 at a single location only, arms 178 have a certain degree of inward and outward resiliency. The inward resiliency is arrested by elongated member 186. The outward resiliency is arrested by the inside surfaces of sidewalls 142, 144 of adapter 102 when ferrule holding clip 104 is inserted into adapter 102. Open areas through which optical fibers 170 can pass are defined between arms 178, 180 and rear support portion 176. Each of arms 178, 180 includes a lug 198 which can be received by apertures 146 of adapter 102.

Figure 8:
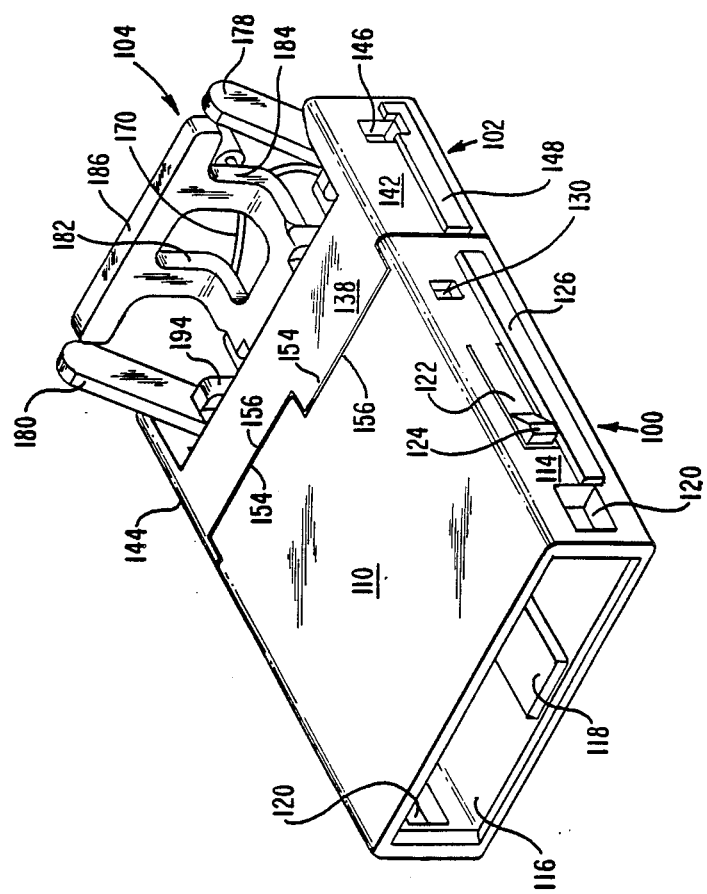
FIG. 8 is a perspective view of the assembled duplex interconnect assembly with an optical fiber cable attached.

Referring now to FIG. 6, ferrules 200, 202 are similar in construction to ferrules 76, 78. Each of ferrules 200, 202 includes a nose portion 204, an annular flange 206, and an 0 ring 208 positioned against the flange 206. Ferrules 200, 202 are positioned in channels 192 of ferrule holding clip 104 in the manner illustrated in FIG. 6. To assemble ferrule holding clip 104 with adapter 102, the arms 178, 180 are pressed toward each other. Because each of arms 178, 180 has a certain degree of resiliency, the arms flex inwardly. The ferrule holding clip 104 is then brought into engagement with adapter 102 while lugs 198 snap into apertures 146. At the same time, nose portions 204 of ferrules 200, 202 project through support openings 158 and into the flared openings 166 of bushings 160. FIG. 8 illustrates the completely assembled interconnect assembly 6.

FIGS. 9 through 12 illustrate the wall outlet 8 which receives the interconnect assembly 6. Wall outlet 8 is designed to be dimensionally compatible with existing electrical wall outlets. Wall outlet 8 comprises a receptacle box 210, a drywall flange 212, a cover plate 216, and a flange and hood assembly 214. The receptacle 210, drywall flange 212, and cover plate 212 are of conventional design and construction for electrical wall outlets and are mounted in the wall 10 in conventional manner.

Figure 10:
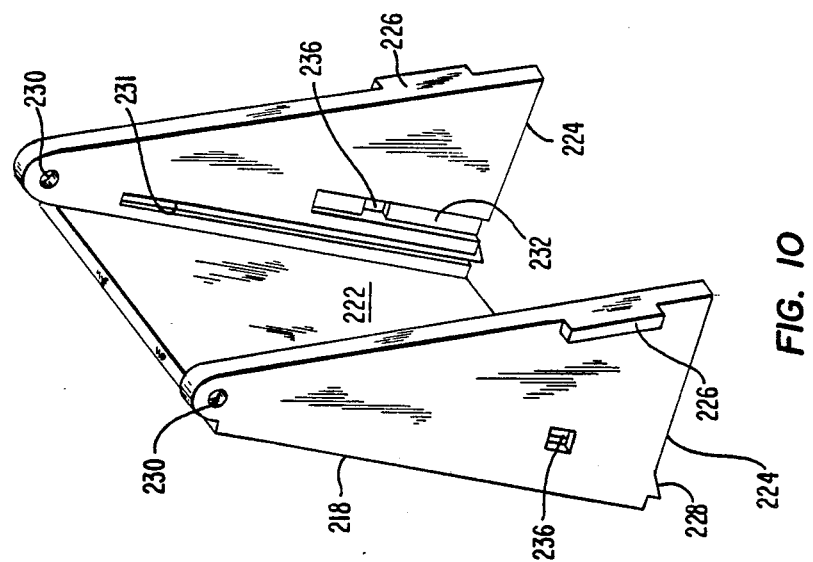
FIG. 10 is a perspective view of the hood forming a portion of the wall outlet.

Flange and hood assembly 214 comprises hood 218 mounted in flange 220 both of which are desirably made as machined metal parts. As best seen in FIG. 10, hood 218 is a tent shaped member comprising a front plate 222, and two substantially triangular sidewalls 224. Shoulders 226 extend outwardly from the rear edge of sidewalls 224, while fingers 228 project downwardly from the lowermost edge of sidewalls of 224. At the top of sidewalls 224 is a pair of apertures 230 designed to receive a shaft for mounting hood 218 into flange 220. On the inside surface of each of sidewalls 224 is a first elongated groove 231 and a second groove 232 of shorter length. Groove 231 is designed to receive the raised ribs 126 and 148 which align with each other when receptacle 100 and adapter 102 are interengaged. Groove 232 is designed to permit lug 124 of latching arm 122 to slide along the inside surface of hood 218 until the lug 124 snaps into place in aperture 236. The front cover 220 of flange 218 includes first and second sets of raised ridges 233, 234 (see FIG. 9). The raised ridges 233 and 234 are designed to act as finger grips for the hood 218.

Figure 12:
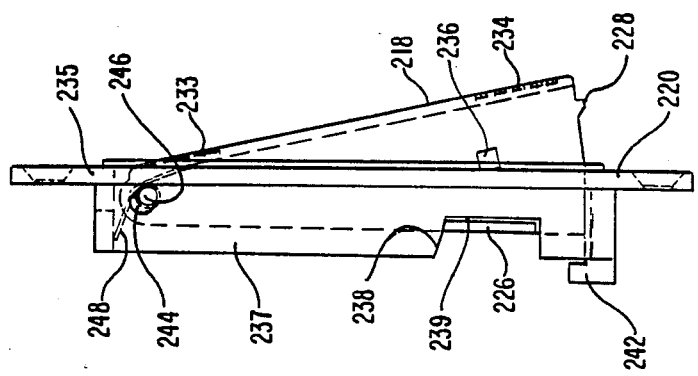
FIGS. 11–12 are cross sectional views taken from the side of the hood in open and closed position.
Figure 11:
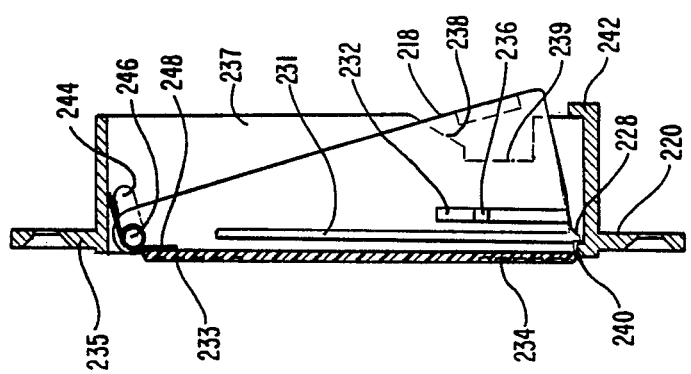

Flange 220, best seen in FIGS. 9, 11 and 12, comprises a substantially rectangular annular member 235 by means of which flange 220 is mounted to the wall 10, and a second annular member 237 which extends inwardly towards the wall 10. Annular member 237 includes a cutaway portion 239 and a sloped edge 238 leading to cutaway portion 239. Along the bottom of annular member 237 are a step 240 at the front and a stop 242 at the rear. On both sides of annular member 237 near the top are oval shaped apertures 244.

Hood 218 is mounted in flange 220 by means of a shaft 246 which projects through the aperture 230 of hood 218 and aperture 244 of flange 220. A spring 248 is coiled about shaft 246 and exerts an outward and downward biasing force on hood 218.

Figure 14:
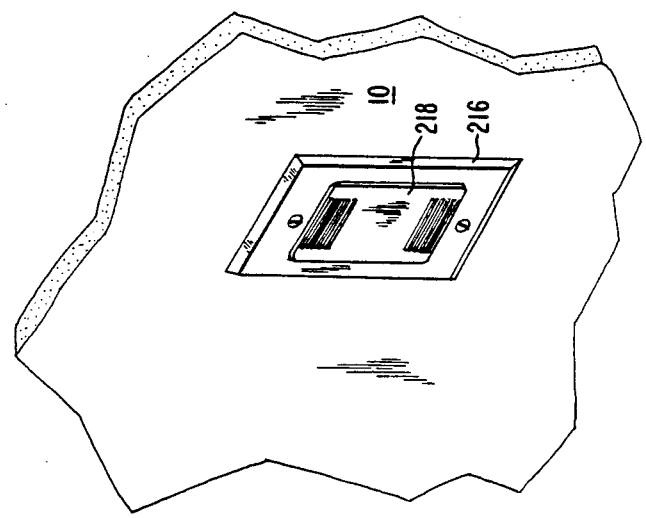
FIG. 14 is a perspective view showing the wall outlet with the hood closed.

Hood 21 may assume a closed or an open position as illustrated in FIGS. 11 and 12. In its initial closed position (FIG. 11), shaft 246 is located at the lowermost point of aperture 244. The spring 248 exerts a strong outward force to the hood 218 which should cause hood 218 to snap outward. However, because fingers 228 are engaged against step 240 of flange 220, hood 218 remains in its closed position. Thus, when wall outlet 8 is not being utilized, hood 218 is unobtrusively flush with the wall (see FIG. 14).

In order to utilize wall outlet 8, an upward force is applied to hood 218 by pulling or pushing against ridges 233. Because apertures 244 of flange 220 are oval in shape, there is enough play in the position of shaft 246 so that it moves upwards and backwards momentarily. This causes fingers 228 to lift free from step 240. Spring 248 then causes hood 218 to snap outward. Hood 218 continues to snap forward until the upper part of shoulders 226 come into contact with the sloped edges 238 of annular member 237. The shoulders 238 will then ride along sloped edges 238 until shoulders 226 snap into place in cutaway portions 239. At this point, hood 218 ceases to snap forward and shaft 246 has moved back into the lowermost position in apertures 244.

To return hood 218 back into the closed position illustrated in FIG. 11, an inward pressure is applied to ridges 234. Hood 218 will pivot about shaft 246 until its lower edge passes through flange 220. Because fingers 228 are approximately triangular in cross section, there will be no difficulty in fingers 228 passing beyond step 240, the shaft 246 being bumped upward momentarily as fingers 228 traverse step 240. Hood 218 can continue to pivot inward until it engages against stop 242 of annular member 237. At this point, if not sooner, the hood 218 can be let go and it can resume the closed position shown in FIGS. 11 and 14.

When the hood 218 is in the open position, a duplex plug 4 connected to optical fiber cable 70 may be interconnected with optical fiber cable 172 as follows. Referring once again to FIGS. 1–3, optical fibers 170 from optical fiber cable 172 are received within the ferrules 200, 202 and placed inside the channels 192 of ferrule holding clip 104. Ferrule holding clip 104 is then mounted inside adapter 102 by pressing arms 178 and 180 towards each other until the lugs 198 snap into slots 146 of adapter 102. The noses 204 of ferrules 200, 202 are thereby mounted inside support openings 158 of adapter 102. The adapter 102 with the attached ferrule holding clip 104 is then brought into engagement with receptacle 100. Latch 128 of receptacle 100 slides along the interior surface of adapter 102 until the lug 152 is received within latch 128. At the same time, latch 150 of adapter 102 interengages with lug 132 of receptacle 100. At this point, illustrated in FIG. 1, ferrule holding clip 104, adapter 102 and receptacle 100 are interengaged while noses 204 of ferrules 200, 202 project through the bushing supports 158 into one end of alignment bushings 160.

The interconnect assembly 6 is then mounted into hood 218 of the wall outlet 8. The assembled interconnect assembly 6 is axially inserted into hood 218 with the raised ribs 126, 148 sliding along groove 231 and the latching arms 122 sliding along the grooves 232 until lugs 124 snap into apertures 236 of hood 218. This position with the interconnect assembly 6 mounted in the wall outlet 8 is illustrated in FIG. 2 as well as FIG. 13.

Figure 15:
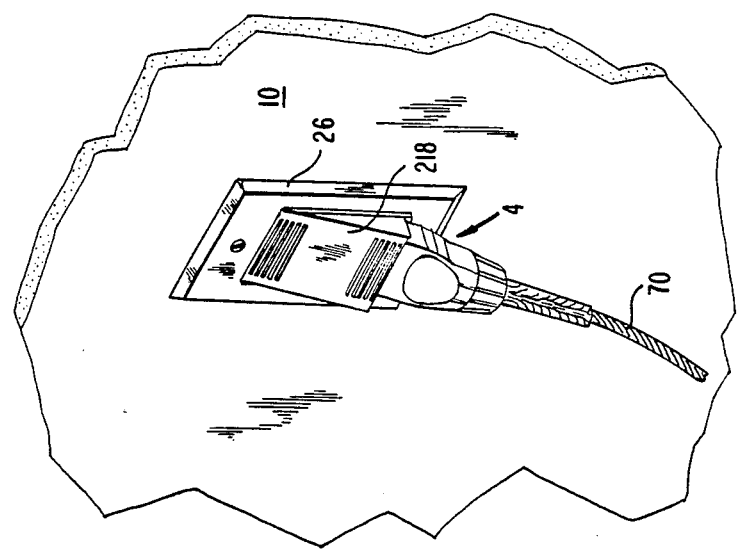
FIG. 15 is a perspective view showing an optical fiber cable terminated by a plug connector plugged into the wall outlet of the present invention.

The interconnect assembly 6 may be left in the wall outlet 8 and the hood 218 can be snapped shut with the interconnect assembly protected inside. When it is desired to utilize wall outlet 8, the hood 218 is snapped open as described hereinabove and the optical fiber cable 70 with optical fibers 72, 74 and fiber terminating ferrules 76, 78 are connected to the interconnect assembly 6. This is accomplished by sliding the plug 4 along the inside surfaces of receptacle 100 until the lugs 26 of latching arms 28 snap into place in slots 120 of receptacle 100. Because ridge 118 can only be received within channel 30 of plug 4, the optical fibers are automatically polarized. The noses 82 of ferrules 76, 78 project into the other end of alignment bushings 160 and are aligned for maximum optical transmission with noses 204 of ferrules 200, 202. This position is illustrated in FIG. 3 as well as FIG. 15 which shows the entirely assembled and interconnected fiber optic connector assembly 2 mounted in the wall.

While the invention has been described by reference to a specific embodiment, this was for purposes of illustration only and should not be construed to limit the spirit or the scope of the invention. For example, the invention is not restricted to duplex to duplex connector but can be suitably adapted for simplex to simplex, and simplex to duplex connector assemblies.

We claim:

1. A fiber optic wall outlet assembly comprising
   an annular flange for mounting to a wall,
   hood means mounted in said annular flange, and movable between a closed position wherein said hood means is substantially flush with said wall and an open position wherein said hood means projects away from said wall,
   biasing means connected to said hood means and biasing said hood means into said open position,
   engagement means on said hood means and cooperating with said flange to releasably engage said hood means into said closed position, and
   release means for releasing said engagement means from said flange and for permitting said biasing means to urge said hood means into said open position.

2. The wall outlet assembly of claim 1 wherein said release means comprises pivot means pivotally securing said hood means to said flange.

3. The wall outlet assembly of claim 1 wherein said release means comprises pivot means pivotally securing said hood means to said flange, said pivot means being mounted for limited rocking movement between first and second positions, said engagement means engaging said hood means in said closed position when said pivot means is in said first position, said engagement means being released and permitting said biasing means to urge said hood means into said open position when said pivot means is in said second position.

4. The wall outlet assembly of claim 3 further comprising guide means on said flange and said hood means for guiding said pivot means from said second position into said first position.

5. The wall outlet assembly of claim 1 wherein said release means comprises a shaft mounted in an oval shaped aperture, said shaft being movable between first and second positions in said oval shaped aperture, said hood means being mounted on and moving with said shaft in said oval shaped aperture, said engagement means engaging said hood means in said closed position when said shaft is in said first position, said engagement means being released and permitting said biasing means to urge said hood means into said open position when said shaft is in said second position.

6. The wall outlet assembly of claim 5 wherein said biasing means comprises a spring coiled about said shaft.

7. The wall outlet assembly of claim 5 further comprising a shoulder on said hood means and a beveled edge on said flange, said shoulder travelling along said bevelled edge to guide said shaft from said second position into said first position.

8. The wall outlet assembly of claim 1 further comprising interconnect assembly means for interconnecting a first optical fiber cable in said wall with a second optical fiber cable.

9. The wall outlet assembly of claim 8 wherein said interconnect assembly is mounted on said hood means and travels with said hood means between said open and closed positions.

10. The wall outlet assembly of claim 8 wherein said interconnect assembly is mounted on an interior surface of said hood means so that said interconnect assembly is within said wall when said hood means is in said closed position.

11. The wall outlet assembly of claim 8 wherein said hood means and said interconnect assembly includes first latch means for latchably securing said interconnect assembly to said hood means.

12. The wall outlet assembly of claim 1 further comprising gripping means on an outside surface of said hood means, said gripping means facilitating actuation of said release means to release said engagement means.

13. The wall outlet assembly of claim 8 wherein said second optical fiber cable is terminated by a plug connector, said plug connector being axially insertable into said interconnect assembly.

14. The wall outlet assembly of claim 13 further comprising second latching means on said plug connector and said interconnect assembly for latchably securing them together.

15. The wall outlet of claim 13 wherein said second optical fiber is a duplex cable and said plug connector is a duplex plug.

16. The wall outlet assembly of claim 8 wherein said interconnect assembly and said hood means include cooperating guiding means for guiding said interconnect assembly into place.

17. The wall outlet assembly of claim 16 wherein said cooperating guiding means comprises a raised ridge on said interconnect assembly and a groove for receiving said raised ridge on an inside surface of said hood means.

18. The wall outlet assembly of claim 8 wherein said first optical fiber is terminated by a ferrule and said interconnect assembly includes ferrule holding means.

19. The wall outlet assembly of claim 18 comprising second latching means on said ferrule holding means and said interconnect assembly for latchably securing them together.

20. A fiber optic wall outlet assembly, comprising
   an annular flange for mounting to a wall,
   hood means mounted in said annular flange, and movable between a closed position wherein said hood means is substantially flush with said wall and an open position wherein said hood means projects away from said wall, an interconnect assembly for interconnecting a first optical fiber cable with a second optical fiber cable said interconnect assembly being mounted on and travelling with said hood means, said interconnect assembly being inside said wall when said hood means is in said closed position, said interconnect assembly being accessible from outside said wall when said hood means is in said open position.

* * * * *